Aug. 14, 1934.   B. V. E. NORDBERG   1,970,055
HOISTING MACHINERY
Filed Feb. 26, 1932   2 Sheets-Sheet 2
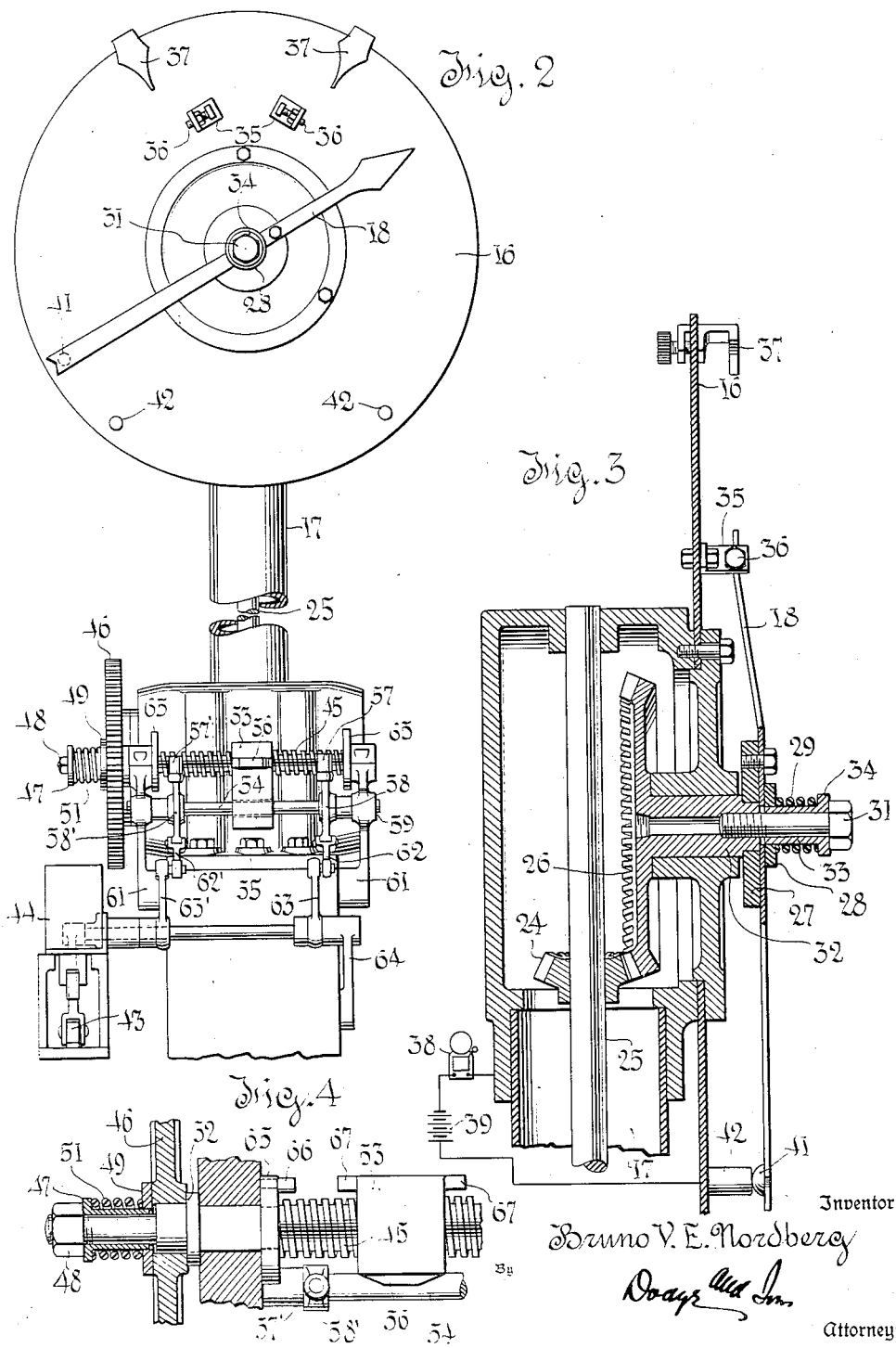
Inventor
Bruno V. E. Nordberg
Attorneys Patented Aug. 14, 1934

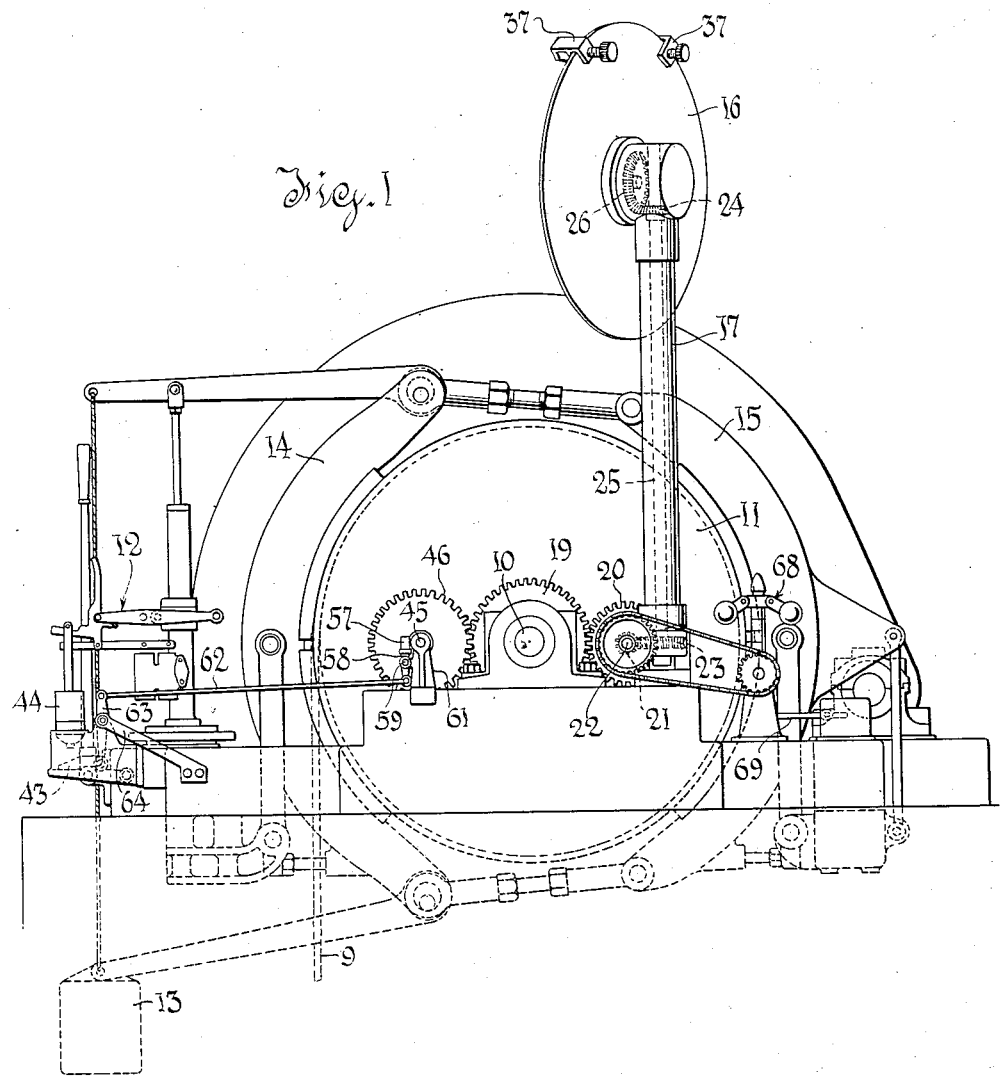

1,970,055

UNITED STATES PATENT OFFICE

1,970,055

HOISTING MACHINERY

Bruno V. E. Nordberg, Milwaukee, Wis., assignor to Nordberg Manufacturing Company, Milwaukee, Wis., a corporation of Wisconsin Application February 26, 1932, Serial No. 595,385

8 Claims. (Cl. 192—138)

This invention relates to hoisting machinery, and particularly to means for indicating the position of the hoist cage and controlling mechanism for stopping the hoist at the proper levels.

In recent years there has come into rather extensive use that type of pulley described in the patent to Bollen, No. 1,369,319, dated February 22, 1921. This type of pulley acts as a clamp to engage the hoist rope as a load is imposed on the rope. Obviously, the pitch line of rope is subject to variations since the radial displacement of the rope changes with different loads. The rope has a tendency to creep with respect to the periphery of the pulley, varying the ratio of rope travel to the revolutions of the driving gears. Under these conditions, it is apparent that an indicator, or miniature, as it is usually called, geared to the driving shaft, does not give a true visual indication of the position of the hoist cage. Similarly, control mechanism for preventing over-travel of the hoist cage, if geared to the drive shaft, will function either prematurely or too late when there is a variation in the ratio of rope travel to the number of drive shaft revolutions.

In the present invention it is proposed to provide a frictionally driven pointer for the miniature, capable of self-adjustment to compensate for differences in rope and drive shaft travel, together with adjustable stop devices adapted to be fixed on the miniature dial for cooperation with the pointer at the upper and lower limits of cage travel.

It is also a purpose of this invention to provide a self-adjusting mechanism for modifying brake application at the upper and lower limits of cage travel, the mechanism including a frictional or impositive connection between the drive gear and a movable cam which cooperates with a step block for varying the degree of brake application as the cage approaches its limits.

The invention will be more fully understood from the following description taken in connection with the accompanying drawings, in which:

Fig. 1 is a side elevation of a mine hoist brake, illustrating the connections of the miniature and brake operating mechanism with respect thereto;

Fig. 2 is a front elevation of the miniature and brake control;

Fig. 3 is a sectional view of the miniature, the connections between the pointer and gearing being shown; and Fig. 4 is a partial view of the brake control.

In the drawings, the drive shaft is indicated at 10 and the brake drum at 11. The automatic brake applying mechanism is indicated generally at 12, and since it is similar to that shown in the patent to Smith-Petersen, No. 1,818,007, dated August 11, 1931, it will not be described in detail. It is sufficient to state that under abnormal conditions, such as failure of current, over-travel, etc., a solenoid is deenergized to permit release of hydraulic pressure employed to elevate weight 13 and thereby allow the weight to fall, whereupon brake shoes 14 and 15 are contracted to brake the drum on the drive shaft and prevent further winding or unwinding of the rope 9 to which the hoist cage is attached.

The miniature or travel indicator comprises a disc 16 mounted on a hollow casing 17 and having a pointer 18 geared to shaft 10. The gearing includes pinion 19 fast on shaft 10, pinion 20 and worm 21, both secured to a second shaft 22, worm gear 23 and bevel gear 24 on the vertical shaft 25, and bevel gear 26 to which the pointer 18 is frictionally secured, as will be later explained. It will be seen that the ratio of pointer travel with respect to the rotation of shaft 10 is made relatively small by the employment of reduction gearing which, in the present instance, is designed to cause the pointer to turn through somewhat less than 360°.

The means for impositively securing pointer 18 to gear 26 comprises a disc 27, to which the pointer is rigidly secured, a washer 28, bearing against the pointer, and spring 29, the compression of which is adjusted by means of a cap screw 31 threaded into the hub 32 of gear 26, and bushing 33 having an annular flange 34 bearing against the spring. Disc 27 and washer 28 are loosely mounted on the gear hub and bushing, respectively, the disc being pressed firmly against hub 32 for rotation therewith. It is apparent that the pointer will turn with the bushing unless engaged by some obstruction in its path, whereupon the connection will yield and relative rotation of the pointer and bushing take place.

Fastened at suitable positions on disc 16 are angle brackets 35 in which are threaded adjustable stops 36, one corresponding with the position of the pointer when the cage has reached its upper limit, and the other positioned to engage the pointer when the cage is at its lower limit of travel. Markers 37 may also be employed for indicating the extreme limits of cage travel and, if desired, intermediate markers may also be fastened to the periphery of the disc to correspond with other levels.

An alarm device for audible signals may be desirable, and for this purpose, an electric bell is shown diagrammatically at 38, a source of current being indicated at 39. The circuit is opened and closed by engagement of a projection 41 on the tail portion of pointer 18 with contacts 42 located at convenient positions on the dial. The circuit is grounded through the shaft casing. As the cage approaches either of its limits, the operator will be warned by ringing of the bell. As shown in Fig. 3, the head of the pointer is bent toward the dial so that it will engage the stops 36. The tail portion of the pointer is spaced from the dial a distance sufficient to permit the tail to pass over the stops.

As stated hereinbefore, there is a tendency for the pointer to race ahead of the rope, due to a certain amount of slippage between the pulley and the rope. Obviously, under these conditions, the pointer will not give a true indication of cage positions and will engage one or the other of the stop devices 36 before the cage actually reaches its upper or lower limit. The impositive attachment of the pointer to gear 26 then permits relative movement between the pointer and the gear and prevents distortion or breaking of the pointer. This displacement of the pointer is relatively small and will not seriously affect the desired indication by which the operator gauges his control apparatus. Usually, the rope is marked to furnish a more accurate determination of cage position, so that the miniature is depended upon only for a rough calculation of position. It is evident, however, that cumulative errors cannot interfere with the accuracy of the pointer with the arrangement illustrated.

In order that the brakes may be applied gradually when the cage is travelling at maximum speed, i. e., at intermediate levels, and more abruptly as the cage reaches its maximum upper and lower positions, means are provided for slowly withdrawing the step block 43 from under the solenoid 44 which actuates the brake applying mechanism 12. This device is shown in Figs. 2 and 4. A threaded shaft 45 is driven from shaft 10 through gears 19 and 46, the latter being frictionally secured to shaft 45. This impositive connection comprises bushing 47 and cap nut 48, both rigidly secured to shaft 45, washer 49 and gear 46, both loosely mounted with respect to the shaft. Normally gear 46 is urged by spring 51 firmly against shoulder 52 on shaft 45 and rotates therewith. Nut 53 is threaded to cooperate with the threads on shaft 45 and is prevented from rotating therewith by a guide rod 54 passing through aperture 55 in the nut. Rotation of shaft 45, therefore, causes rectilinear movement of the nut, the direction of its travel depending on whether the cage is being lowered or elevated. The nut is provided with cam portion 56 having two inclined faces adapted to engage rollers 57, 57', respectively, at each end of its rectilinear travel, this travel being proportioned to cage travel, and the cam engaging the rollers as the cage approaches its upper and lower limits.

Rollers 57, 57' are mounted on levers 58, 58', pivoted at 59 on bracket 61. Links 62, 62' connect the levers with levers 63, 63' pivoted to bracket 64 and connected to the step block 43. As nut 53 approaches either end of shaft 45, cam 56 will engage one or the other of rollers 57, 57', rocking the levers and gradually withdrawing step block 43. It is apparent that the brakes can be only partially applied while the cage is moving rapidly at levels intermediate the lowermost and uppermost limits of travel, but, as the cage approaches said limits, the operator is enabled to bring the cage to rest more abruptly.

Keyed or otherwise secured to shaft 45 near each end thereof are discs 65 having stop lugs 66 thereon. Nut 53 is also provided with lugs 67 so disposed that when the nut has reached a position corresponding with uppermost or lowermost cage positions, the lugs will engage and prevent further rotation of shaft 45. Gear 46, being secured to the shaft by frictional means previously described, may now yield with respect to the shaft, thus compensating for any variation in rope displacement with respect to the drive shaft. Since this self-adjustment or compensation occurs when the nut is at either end of the shaft, cumulative variations in the ratio of rope displacement and rotation of the drive shaft will not interfere with normal operation of the step block.

Overspeed control may be effected by any suitable form of governor, but preferably a centrifugal governor 68 connected to switch 69 is employed. When switch 69 is opened, it is understood that solenoid 44 is deenergized to apply the brakes, and, if desired, an audible signal may be connected to the governor to warn the operator of overspeed.

While the several parts of the invention are illustrated as spaced from each other, it is intended, so far as is practicable, to arrange them in a unit capable of ready attachment to any hoist. It is also contemplated that changes may be made to permit ready adjustment of the parts where such adjustment is desirable. It is evident, for instance, that cam 56 may be made in two parts which may be adjustable with respect to each other and that the stops 66 may be adjustable along threaded shaft 45. Other modifications may be incorporated without departing from the essentials of operation.

What is claimed is:—

1. In combination with a hoist, a drive shaft therefor; a brake; hoist position indicating mechanism; means for modifying brake application as the hoist approaches its extreme upper and lower positions; and impositive means connecting said drive shaft to said indicating mechanism and said modifying means.

2. In combination with a hoist, a drive shaft therefor; a brake; hoist position indicating mechanism; means for modifying brake application as the hoist approaches its extreme upper and lower positions; and frictional displaceable means connecting said drive shaft to said indicating mechanism and said modifying means.

3. In combination with a hoist, a drive shaft therefor; a brake; hoist position indicating mechanism; means for modifying brake application as the hoist approaches its extreme upper and lower positions; stop members adapted to be engaged by the indicating mechanism and modifying means when the hoist is in its uppermost or lowermost positions; and impositive means connecting said drive shaft to said mechanism and said modifying means, said connecting means being displaceable to relative movement of the indicating mechanism and the modifying means with respect to the drive shaft when the former are engaged by said stop members.

4. In combination with a hoist, a drive shaft therefor; a brake; brake applying mechanism; hoist position indicating mechanism; means for actuating said brake applying mechanism when the drive shaft reaches a predetermined speed; means for modifying brake application as the hoist approaches its extreme upper and lower positions; and impositive means connecting said drive shaft to said indicating mechanism and said modifying means.

5. In combination with a hoist, a drive shaft therefor; a brake; means for applying said brake; means for modifying brake application as the hoist approaches its extreme upper and lower positions, including a cam moving in timed relation to said drive shaft and a step-block for limiting brake application, said step-block being moved by said cam; and an impositive connection between the drive shaft and said modifying means.

6. In combination with a hoist, a drive shaft therefor; a brake; means for applying said brake including a normally energized solenoid; a step-block cooperating with said solenoid when the solenoid is deenergized to limit application of said brake; a cam member; means geared to said drive shaft for reciprocating said cam member; and means engageable by the cam member when the hoist approaches its extreme upper and lower limits for modifying the engaging position of said step-block with respect to said solenoid.

7. In combination with a hoist, a drive shaft therefor; a brake; means for applying said brake; means for modifying brake application as the hoist approaches its extreme upper and lower positions; and impositive means connecting said drive shaft to said modifying means.

8. In combination with a hoist, a drive shaft therefor; a brake; means for applying said brake; means for modifying brake application as the hoist approaches its extreme upper and lower positions; stop members adapted to be engaged by the modifying means when the hoist is in its uppermost and lowermost positions; and impositive means connecting said drive shaft to said modifying means, said connecting means being displaceable to relative movement of the modifying means with respect to the drive shaft when said modifying means is engaged by said stop members.

BRUNO V. E. NORDBERG.